United States Patent [19]

Kidawara et al.

[11] Patent Number: 4,524,920

[45] Date of Patent: Jun. 25, 1985

[54] FILM CASSETTE

[75] Inventors: Atsushi Kidawara; Kazunari Kobayashi, both of Tokyo, Japan

[73] Assignee: Olympus Optical Co., Ltd., Tokyo, Japan

[21] Appl. No.: 513,238

[22] Filed: Jul. 13, 1983

[30] Foreign Application Priority Data

Jul. 20, 1982 [JP] Japan .................. 57-126131
Aug. 10, 1982 [JP] Japan .............. 57-121213[U]
Aug. 10, 1982 [JP] Japan .............. 57-121214[U]

[51] Int. Cl.$^3$ .................. B65D 85/67; B65H 19/00
[52] U.S. Cl. ........................... 242/71.1; 242/71.2
[58] Field of Search ............... 242/71.1, 71.2; 354/275

[56] References Cited

U.S. PATENT DOCUMENTS 2,183,522 12/1939 Wittel et al. .............. 242/71.2 X
2,511,383 6/1950 Summers .................. 242/71.1
3,422,740 1/1969 Nerwin .................. 242/71.1 X
4,002,238 1/1977 Cameron et al. .............. 242/71.1 X

FOREIGN PATENT DOCUMENTS 837962 3/1970 Canada .................. 242/71.1

Primary Examiner—Stuart S. Levy
Assistant Examiner—Lloyd D. Doigan
Attorney, Agent, or Firm—Frishauf, Holtz, Goodman & Woodward

[57] ABSTRACT

A film cassette includes a cassette main body with a film supply portion and a film take-up portion, a spool rotatably arranged at said film take-up portion of the cassette main body, and bearings arranged at the film take-up portion for rotatably supporting the spool. The spool comprises an outer cylinder around which a film is wound, an inner cylinder which is slidable in an axial direction relative to the outer cylinder and which is rotatable with the outer cylinder, and a compression spring, one end of which is engaged with the outer cylinder and the other end of which is engaged with the inner cylinder and biasing and moving the outer and inner cylinders relative to each other in the axial direction.

11 Claims, 9 Drawing Figures

FILM CASSETTE

BACKGROUND OF THE INVENTION

The present invention relates to a film cassette for use in an endoscope camera. An endoscope camera comprises, for example, a film supply portion and a film take-up portion with a bridge interposed therebetween. A film take-up spool is rotatably mounted at the film take-up portion of the film cassette, and engagement pawls formed integrally with the spool are exposed to the upper surface of the film cassette. A cover is mounted at the rear side of a camera main body of the endoscope camera so as to be free to open or close. The cover is opened/closed to mount the film cassette in a cassette chamber of the camera main body.

In this case, the film cassette is mounted in the cassette chamber by sliding along the optical axis from the rear side of the camera main body. In order to prevent interference between a film take-up shaft of the camera and the film cassette, the film take-up shaft is vertically movable. When the film cassette is mounted, the film take-up shaft is moved upward. After the film cassette is mounted, the film take-up shaft is lowered to engage with the engagement pawls of the film cassette.

However, when the film take-up shaft is made vertically movable, the height of the camera main body must be increased to accommodate the stroke of the film take-up shaft. Furthermore, the overall mechanism becomes complex. After photography, the film cassette must be removed from the camera, resulting in cumbersome operation.

SUMMARY OF THE INVENTION

It is an object of the present invention to provide a film cassette which does not require a great height of a camera main body, which is easy to mount in and remove from the camera main body, and which is simple in construction.

In order to achieve the above and other objects of the present invention, a film cassette comprises a spool which has an outer cylinder around which a film is wound, an inner cylinder which is slidable along an axial direction relative to said outer cylinder and which is rotatable with the outer cylinder, and biasing means for biasing said outer and inner cylinders so that said outer and inner cylinders are slidable relative to each other along the axial direction.

In the film cassette of the invention, since the inner cylinder can project outward from the outer cylinder, the height of the cassette chamber may be set to substantially coincide with the height of the outer cylinder. Thus, the camera main body can be reduced in height. When the spool is mounted in the cassette chamber, the inner cylinder is automatically moved in the axial direction by the biasing means so as to engage with the film take-up shaft of the camera. Accordingly, the mounting operation of the cassette is easy, and the cassette is simple in construction.

BRIEF DESCRIPTION OF THE DRAWINGS

FIGS. 1 to 7 show a film cassette according to an embodiment of the present invention, in which
FIG. 1 is a plan view of the film cassette,
FIG. 2 is a front view of the same,
FIG. 4 is a longitudinal sectional view of a film take-up portion of the film cassette,
FIG. 5 is a cross-sectional view of the film take-up portion along the line V—V in FIG. 4,
FIG. 6 is a longitudinal sectional view of a part of the camera with the film cassette mounted therein,
and
FIG. 7 is a cross-sectional view of the same.

DETAILED DESCRIPTION OF THE PREFERRED EMBODIMENT

A film cassette according to an embodiment of the present invention will now be described with reference to the accompanying drawings.

Figure 1:
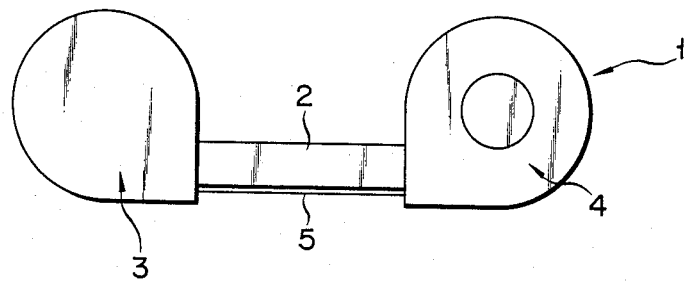
Figure 2:
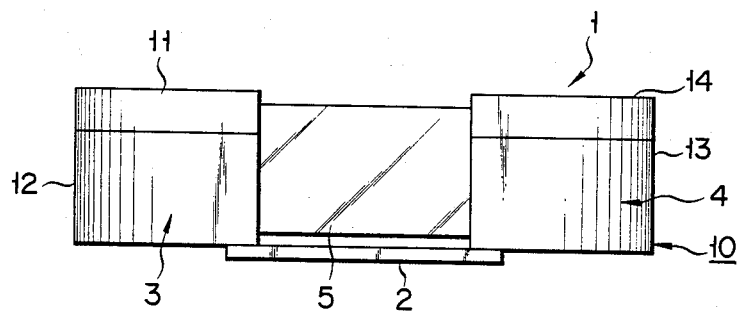

FIGS. 1 and 2 show a film cassette for use in an endoscope camera. A cassette main body 1 comprises a film supply portion 3 and a film take-up portion 4 with a bridge 2 interposed therebetween. An unexposed film 5 of 8- or 16-mm width is wound around the film supply portion 3. One end of the film 5 is connected to a spool 20 (to be described later) of the film take-up portion 4.

Figure 3A:
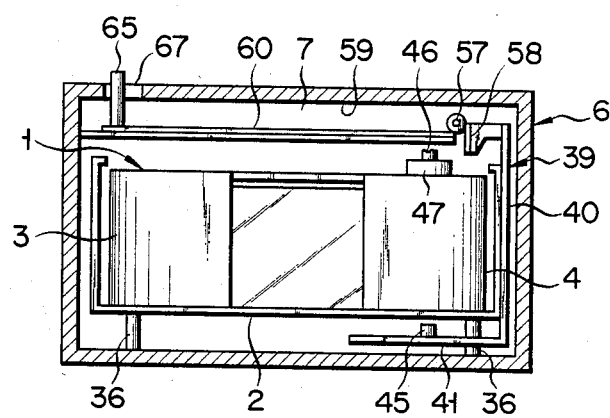
FIGS. 3A and 3B are a sectional view and a side view, respectively, of an endoscope camera using the film cassette shown in FIG. 1.
Figure 3B:
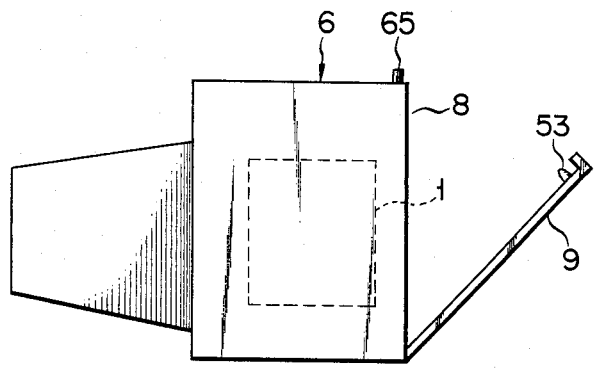

FIGS. 3A and 3B show an endoscope camera. A camera main body 6 has a cassette chamber 7 for receiving the cassette main body 1. A cover 9 for opening or closing an aperture 8 of the cassette chamber 7 is pivotally mounted at its lower end to the rear side of the camera main body 6.

The cassette main body 1 is mounted in the cassette chamber 7 as shown in FIG. 3A by pivoting the cover 9 about its lower end and sliding the cassette main body 1 along the optical axis from the rear side of the camera main body 6.

Figure 4:
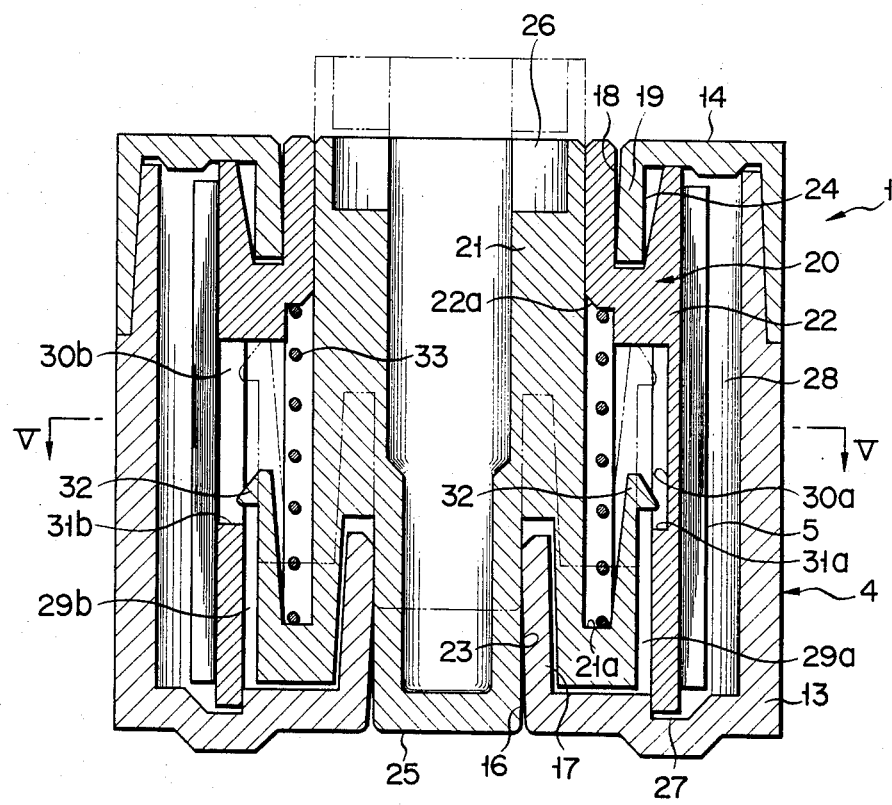
Figure 5:
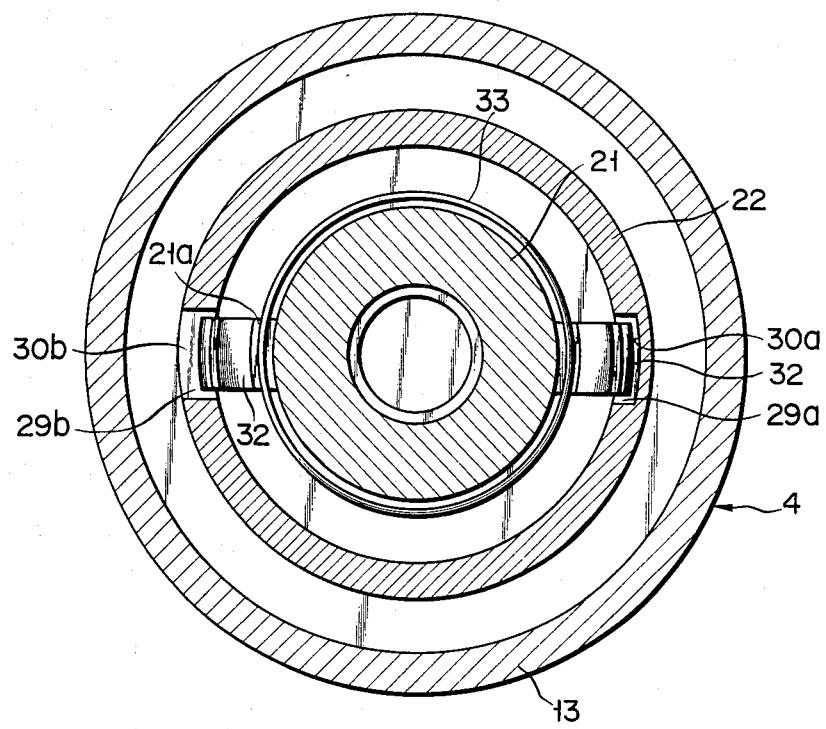

The cassette main body 1 will now be described with reference to FIGS. 2, 4 and 5.

Reference numeral 10 denotes a lower case, and 11 and 14 denote covers. The lower case 10 is formed integrally from a synthetic resin with a first cylindrical portion 12 constituting the film supply portion 3, a second cylindrical portion 13 constituting the film take-up portion 4, and the bridge 2. The cylindrical portions 12 and 13 have open upper ends and closed lower ends. The covers 11 and 14 close the upper ends of the cylindrical portions 12 and 13, respectively, such that the covers are free to open and close. A circular aperture 16 is formed at the center of the bottom of the second cylindrical portion 13. An annular bearing or rib 17 extends upward from the edge of the bottom of the cylindrical portion 13 defining the aperture 16. An aperture 18 is formed at the center of the cover 14 such that it opposes the aperture 16 and has a diameter greater than that of the aperture 16. An annular bearing 19 extends downward from the edge of the cover 14 defining the aperture 18. The apertures 16 and 18 are coaxial with each other. The spool 20 is coaxially supported between these apertures 16 and 18 by the bearing or rib 17 and the bearing 19.

The spool 20 has a double structure having an inner cylinder 21 and an outer cylinder 22 of synthetic resin. An annular groove 23 formed in the lower surface of the inner cylinder 21 receives the bearing or rib 17, and an annular groove 24 formed in the upper surface of the outer cylinder 22 rotatably engages with the bearing 19. The inner cylinder 21 has an open upper end and a closed lower end. A bottom 25 of the inner cylinder 21 is exposed through the aperture 16. A plurality of engagement pawls 26 are formed at predetermined intervals at the upper portion of the inner surface of the inner cylinder 21 so as to be exposable through the aperture 18. The upper end of the inner surface of the outer cylinder 22 which is divided by the annular groove 24 is interposed between the bearing 19 and the inner cylinder 21. The lower end of the outer cylinder 22 is inserted in a bearing 27 which comprises an annular groove formed in the bottom of the cylindrical portion 13 to be concentric therewith. Thus, the lower end of the outer cylinder 22 serves to optically shield from the outside a film chamber 28 defined between the outer surface of the outer cylinder 22 and the cylindrical portion 13. Two guide grooves 29a and 29b extend vertically at an angular interval of 180° on the inner surface of the outer cylinder 22. A recess 30a is formed in the upper portion of the inner surface of the guide groove 29a, and a through aperture window 30b is formed in the guide groove 29b. Alternately, a recess may be formed in the guide groove 29b and a through aperture window may be bored in the guide groove 29a. Steps 31a and 31b are formed at the lower ends of the guide grooves 29a and 29b, respectively. Two engagement pawls 32 having an L-shaped sectional shape are formed at the lower portion of the outer surface of the inner cylinder 21 in correspondence with the guide grooves 29a and 29b, respectively. The distal ends of the engagement pawls 32 extend into the recess 30a and the aperture window 30b, respectively. The inner cylinder 21 is not rotatable relative to the outer cylinder 22, but it rotates together with the outer cylinder 22. The inner cylinder 21 is movable in the thrust direction (in the vertical direction) relative to the outer cylinder 22. In this case, the stroke of the inner cylinder 21 in the thrust direction is regulated by the axial length of the recess 30a and the aperture window 30b which engage with the engagement pawls 32. An annular gap is defined between the outer surface of the inner cylinder 21 and the inner surface of the outer cylinder 22. A compression spring 33 is arranged in this gap such that its upper end is hooked to a stopper 22a of the outer cylinder 22 and its lower end is hooked to a stopper 21a of the inner cylinder 21. The compression spring 33 biases the inner cylinder 21 downward relative to the outer cylinder 22, that is, in the direction such that the engagement pawls 26 are withdrawn into the aperture 18. Thus, the upper end of the inner cylinder 21 is held flush with the upper ends of the outer cylinder 22 and the cover 11.

Figure 6:
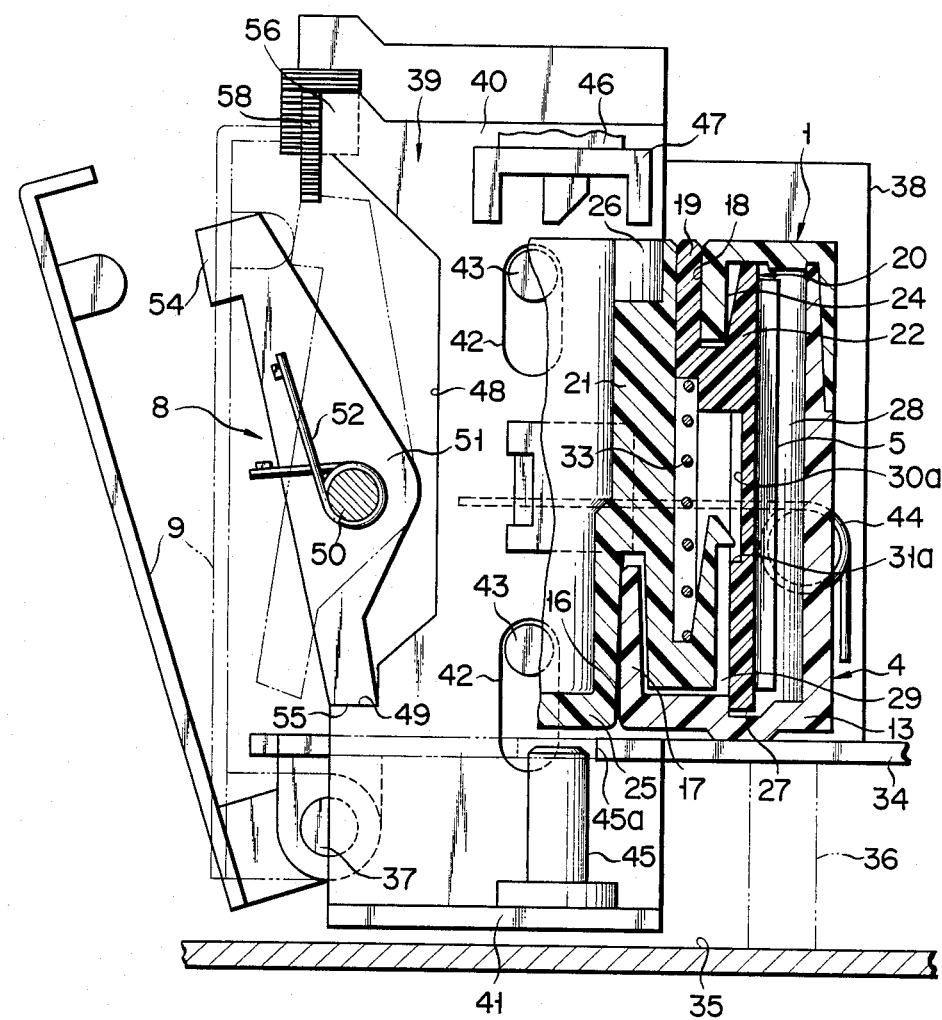
Figure 7:
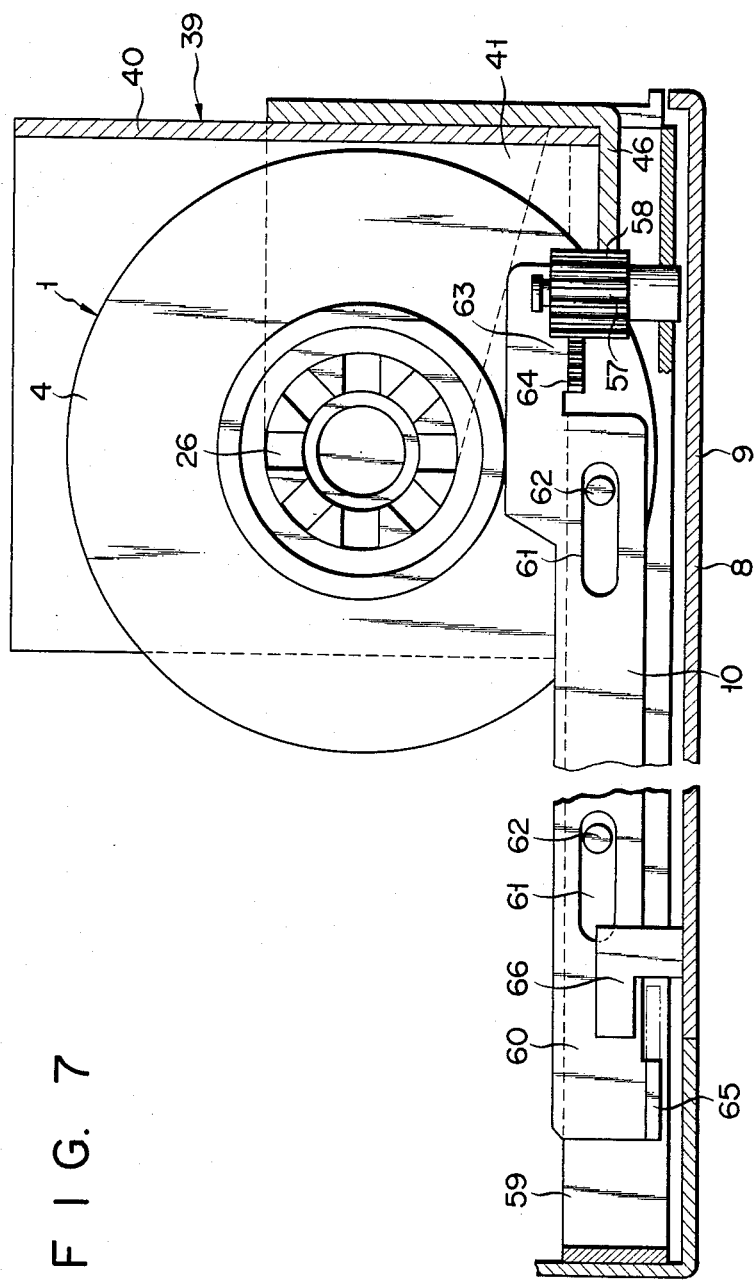

The camera main body 6 for mounting the film cassette as described above will now be described with reference to FIGS. 6 and 7. Referring to FIGS. 6 and 7, reference numeral 34 denotes a support member arranged at the lower portion of the cassette chamber 7. The support member 34 is fixed by a plurality of support bases 36 extending from a bottom 35 of the cassette chamber 7. Thus, the support member 34 is spaced apart from the bottom 35 of the cassette chamber 7 by a predetermined distance. A pivot pin 37 is horizontally arranged below the front portion of the support member 34. The lower end of the cover 9 is pivotally mounted on the pivot pin 37 so as to open/close the aperture 8 of the cassette chamber 7. A pair of support walls 38 (only one support wall shown in FIG. 6) are formed at two ends of the support member 34 along the side surfaces of the cassette chamber 7. A slide plate 39 is arranged at one of the support walls 38, that is, at the side which opposes the film take-up portion 4 of the cassette main body 1. The slide plate 39 has an L-shape. A vertical plate 40 of the slide plate 39 opposes the outer side surface of the support wall 38, while a horizontal plate 41 thereof opposes the lower surface of the support member 34. Two vertically elongated holes 42 are formed in the vertical plate 40 of the slide plate 39. Pins 43 extending from the support wall 38 are loosely fitted in these elongated holes 42. Thus, the slide plate 39 is supported by the pins 43 received in the elongated holes 42 to be vertically movable. A spring 44 is arranged between the slide plate 39 and the support wall 38. The spring 44 normally biases the slide plate 39 upward. A press-up pin 45 stands upright on the upper surface of the horizontal plate 41 of the slide plate 39. A through hole 45a is formed in the support member 34 to oppose the press-up pin 45. The press-up pin 45 opposes the inner cylinder 21 at the film take-up portion 4 of the cassette main body 1 mounted on the support member 34. When the slide plate 39 is moved upward, the press-up pin 45 abuts against the bottom 25 of the inner cylinder 21 and moves the inner cylinder 21 upward against the biasing force of the spring 44. Thus, the press-up pin 45 moves the inner cylinder 21 of the spool 20 upward relative to the outer cylinder 22 so that the engagement pawls 26 engage with a pawl portion 47 of a film take-up shaft 46 at the upper portion of the cassette chamber 7. A notch 48 is formed at the center of the rear end face of the vertical plate 40 of the slide plate 39, and an engaging step 49 is formed at the lower end of the notch 48. A pin 50 extends horizontally from the support wall 38 to oppose the notch 48. A locking lever 51 is pivotally mounted on the pin 50. The locking lever 51 is normally biased counterclockwise (FIG. 6) by a spring 52, the two ends of which are hooked to the lever 51 and to the support wall 38, respectively, and the central portion of which is wound around the pin 50. An acting portion 54 is formed at the upper end of the locking lever 51 so as to oppose a press portion 53 formed at the rear side of the cover 9. An engagement portion 55 is formed at the lower end of the locking lever 51 so as to be engageable with the engaging step 49. The locking lever 51 is pivoted in synchronism with the cover 9 in the following manner. When the cover 9 is opened, the lever 51 is pivoted counterclockwise by the biasing force of the spring 52. Then, the engagement portion 55 engages with the engaging step 49 so as to lock the slide plate 39 at its lower position. On the other hand, when the cover 9 is closed, the acting portion 54 is pressed by the press portion 53. The engagement portion 55 is disengaged from the engaging step 49 so as to release the sliding plate 39 from its locked position.

A bent portion 56 is formed on one side of the upper end of the slide plate 39, that is, on the side of the cassette chamber 7 which opposes the aperture 8. A rack 58 meshing with a pinion 57 is formed at the distal end of the bent portion 56 to extend vertically therefrom. The pinion 57 is rotatably mounted on a horizontal shaft at a cantilever bearing formed on a support plate 59 extending horizontally along the aperture 8 of the cassette chamber 7, as shown in FIG. 7. A slider 60 is mounted on the support plate 59 so as to be slidable in the horizontal (right-to-left; longitudinal) direction. Two elongated holes 61 are formed along the longitudinal direction of the slider 60. Pins 62 formed on the support plate 59 are respectively loosely fitted in the elongated holes 61. The slider 60 is slidable to the left and right within the range of the length of the elongated holes 61. A bent portion 63 is formed at one end of the slider 60. The bent portion 63 extends horizontally, and has a rack 64 engageable with the pinion 57. An engagement pawl 65 projects from the upper surface at the other end of the slider 60 and is engageable with a hook 66 formed at the rear surface of the cover 9. When the slider 60 is slid to the right (FIG. 7) by the pinion 57, the engagement pawl 65 engages with the hook 66 to lock the cover 9 in the closed position. When the slider 60 is slid to the left, the locking between the engagement pawl 65 and the hook 66 is released. As shown in FIG. 3A, the engagement pawl 65 extends upward through a slit 67 formed in the upper surface of the camera main body 6.

The mounting and removal operations of the film cassette to and from the camera main body 1 will now be described.

In the state where the cover 9 of the camera main body 6 is opened, the locking lever 51 is pivoted counterclockwise by the biasing force of the spring 52, as indicated by the solid line in FIG. 6. Thus, the engagement portion 55 engages with the engaging step 49 of the slide plate 39 so as to hold the slide plate 39 at its lower position against the biasing force of the spring 44. When the cassette main body 1 is inserted into the cassette chamber 7 from the rear side thereof along the optical axis in this state, the cassette main body 1 is placed on the support member 34 of the cassette chamber 7. When the cassette main body 1 is mounted in place in the cassette chamber 7 and thereafter the cover 9 is closed, the acting portion 54 of the locking lever 51 is pressed by the press portion 53 of the cover 9. Thus, the locking lever 51 is pivoted clockwise against the biasing force of the spring 52, and the engagement portion 55 is disengaged from the engaging step 49 and is held at a position indicated by the alternate long and two short dashed line in FIG. 6. When the slide plate 39 is unlocked, it is slid upward by the biasing force of the spring 44. Then, the press-up 45 extends upward through the through hole 45a and abuts against the inner cylinder 21 of the film take-up portion 4 of the cassette main body 1. Although the inner cylinder 21 is biased downward by the compression spring 33, it is also biased upward by the spring 44 which has a stronger biasing force than that of the spring 33. Therefore, the inner cylinder 21 is moved upward by the press-up pin 45, and the engagement pawls 26 of the inner cylinder 21 engage with the pawl portion 47 of the film take-up shaft 46. Thus, the rotation of the film take-up shaft 46 is transmitted to the inner cylinder 21 through the engagement pawls 26 engaging with the pawl portion 47, while rotation of the inner cylinder 21 is transmitted to the outer cylinder 22 through the engagement pawls 32. Thus, the film 5 at the film supply portion 3 may be wound by the outer cylinder 22.

The upward sliding movement of the sliding plate 39 is transmitted to the pinion 57 through the rack 58, and rotation of the pinion 57 is transmitted to the slider 60 through the rack 64. Therefore, the slider 60 is slid to the right, while the engagement pawl 65 engages with the hook 66 to hold the cover 9 in its closed position.

When photography is completed and the cassette main body 1 is removed from the camera main body 6, the engagement pawl 65 projecting from the upper surface of the camera main body 6 is slid to the left by a finger or the like. Then, the engagement pawl 65 is disengaged from the hook 66, and the cover 9 is released from its closed position. When the engagement pawl 65 is moved to the left, the slider 60 is slid to the left therewith. Thus, the pinion 57 meshing with the rack 64 is rotated in the reverse direction. The slide plate 39 is slid downward by means of the rack 58 meshing with the pinion 57 against the biasing force of the spring 44. The press-up pin 45 is moved downward, the inner cylinder 21 of the camera main body 1 is moved downward by the biasing force of the spring 33, and the engagement pawls 26 are disengaged from the pawl portion 47 of the film take-up shaft 46. The upper end face of the inner cylinder 21 becomes substantially flush with the upper ends of the outer cylinder 22 and the cover 14. The cover 9 may then be pivoted about the pivot pin 37 to open the aperture 8 of the cassette main body 1. As a result, the locking lever 51 is pivoted counterclockwise by the biasing force of the spring 52 and the engagement portion 55 engages with the engaging step 49. The slide plate 39 is locked in its lower position, and the cassette main body 1 can be removed from the cassette chamber 7 from the rear side thereof.

In this manner, during mounting or removal of the cassette main body 1 to and from the camera main body 6, the film take-up shaft 6 need not be vertically moved, unlike in a conventional film cassette, and can be easily removed from the rear side of the camera main body 6. After the cassette main body 1 is mounted, the cover 9 need only be closed. Then, the slide plate 39 interlocked with the cover 9 slides, and the engagement pawls 26 of the film take-up shaft 4 are automatically engaged with the pawl portion 47 of the film take-up shaft 4.

Figure 8:
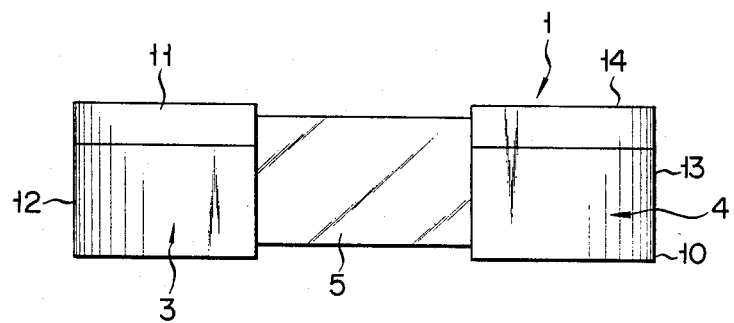
FIG. 8 is a front view showing another modification of the film cassette.

In the cassette main body 1 of the embodiment described above, the film supply portion 3 and the film take-up portion 4 are mechanically connected by the bridge 2. However, as shown in FIG. 8, the bridge 2 may be omitted. In this case, the film supply portion 3 and the film take-up portion 4 are connected by the film 5 alone.

The portion of the engagement pawl 65 which outwardly projects may be provided on the vertical plate 40 of the slide plate 39. In this case, the slit 67 is formed in the side wall of the camera main body 6 on the side of the side plate 39 and the slide lever projects on the side wall. In such a construction, the slide lever is downwardly moved to rotate the pinion 57 by the rock 58 on the slide plate 39 so as to slide the slider 60 in the left-direction, so that the hook 66 may be disengaged against the engagement pawl, thereby releasing the cover 9. Thus the cover may open.

What is claimed is:
1. A film cassette comprising:
a cassette main body having a film supply portion and a film take-up portion;
said cassette main body including a case with a first aperture at one end thereof, a second aperture at the opposite end thereof, and a cover closing said first aperture, said cover having an aperture therein;
a spool arranged at said film take-up portion of said cassette main body, said spool comprising:
an outer cylinder around which a film is wound;
an inner cylinder which is slidable in an axial direction relative to said outer cylinder and which is rotatable with said outer cylinder, said inner cylinder having opposite ends, one of which is at said second aperture and the other of which is passable through said aperture in said cover to project outward; and biasing means for biasing and moving said outer and inner cylinders relative to each other in the axial direction thereof to bias said inner cylinder into said outer cylinder and into said cassette main body; and bearing means arranged at said film take-up portion of said cassette main body for rotatably supporting said spool, said bearing means including a pair of bearings formed at said cover and said case, respectively, of said cassette main body, said bearings each rotatably supporting respective opposite ends of said outer cylinder;

said inner cylinder being pushable at said one end thereof in the axial direction through said second aperture of said case to cause said inner cylinder to project outward from said aperture of said cover.

2. A film cassette according to claim 1, wherein said biasing means includes a compression spring, one end of which is engaged with said outer cylinder and the other end of which is engaged with said inner cylinder.

3. A film cassette according to claim 2, wherein said one end of said compression spring is hooked to said outer cylinder, and said other end of said compression spring is hooked to said inner cylinder.

4. A film cassette according to claim 2, wherein said inner cylinder is pushable at said one end thereof against the biasing force of said compression spring to cause said inner cylinder to project outwardly from said aperture of said cover.

5. A film cassette according to claim 2, wherein said outer and inner cylinders define an annular gap therebetween, and said compression spring includes a coil spring disposed in said annular gap so as to surround said inner cylinder.

6. A film cassette according to claim 5, wherein said outer cylinder has an engaging groove formed to extend axially along an inner surface thereof, and said inner cylinder has an engaging pawl which projects outward such that a distal end thereof engages with said engaging groove, said engaging pawl in said engaging groove being movable in the axial direction of said outer cylinder and not being movable in a circumferential direction thereof.

7. A film cassette according to claim 5, wherein said inner cylinder has a bottom end exposed outside said case and an engagement pawl formed at the top end thereof.

8. A film cassette according to claim 1 wherein said cassette main body has a bridge which connects said film supply portion and said film take-up portion and which is formed integrally therewith.

9. A film cassette according to claim 1, wherein said film supply portion and said film take-up portion are separated from each other.

10. A film cassette according to claim 1, wherein said biasing means is disposed between the outer and inner cylinders, the inner cylinder being slidable in the axial direction within the outer cylinder and rotatable in the circumferential direction with the outer cylinder, and the outer and inner cylinders and, biasing means constituting an integral unit.

11. A film cassette according to claim 1, wherein said inner cylinder is pushable at said one end thereof against the biasing force of said biasing means to cause said inner cylinder to project outwardly from said aperture of said cover.

* * * * *